March 8, 1960 W. M. SHOFFNER 2,927,404
WORK SUPPORT AND GAUGING MEANS FOR A CUT-OFF MACHINE
Filed Dec. 9, 1957 2 Sheets-Sheet 1

INVENTOR.
WILLIE M. SHOFFNER
BY
Marechal, Biebel, French y Bugg
ATTORNEYS

March 8, 1960 W. M. SHOFFNER 2,927,404
WORK SUPPORT AND GAUGING MEANS FOR A CUT-OFF MACHINE
Filed Dec. 9, 1957 2 Sheets-Sheet 2
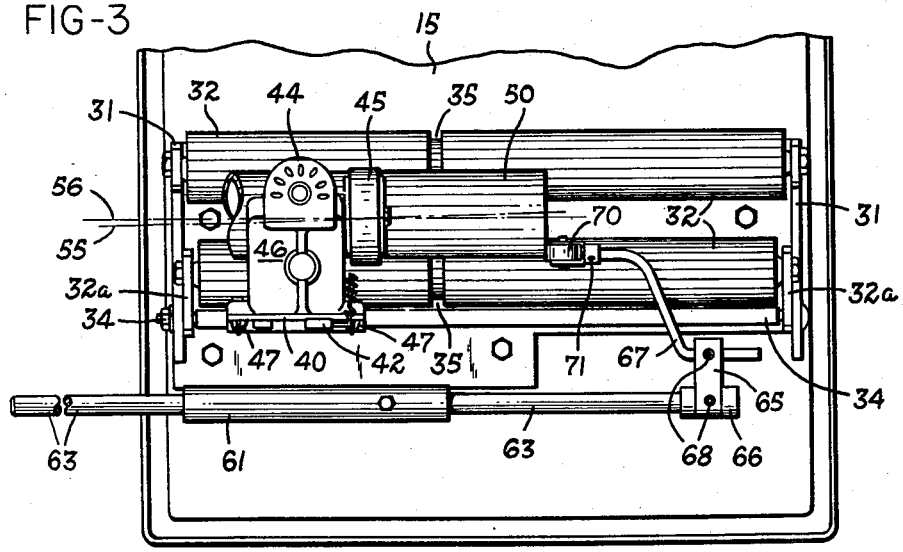
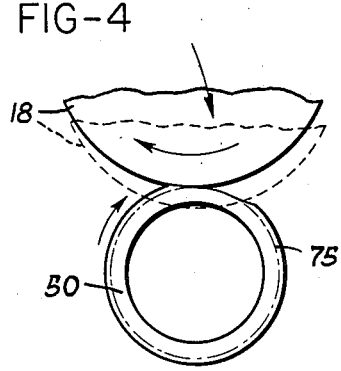
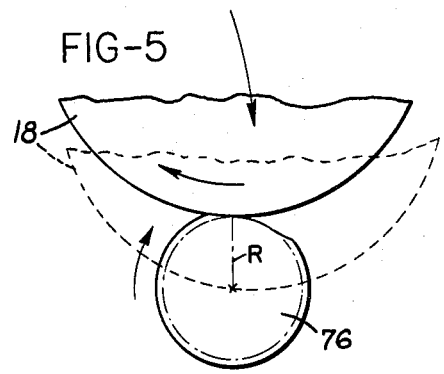
INVENTOR.
WILLIE M. SHOFFNER
BY
ATTORNEYS ately 2,927,404
Patented Mar. 8, 1960

2,927,404

WORK SUPPORT AND GAUGING MEANS FOR A CUT-OFF MACHINE

Willie M. Shoffner, Dayton, Ohio, assignor to The Fogarty Manufacturing Company, Dayton, Ohio, a corporation of Ohio Application December 9, 1957, Serial No. 701,473

3 Claims. (Cl. 51—98)

This invention relates to supports for holding elongated stock and more particularly to a support for rotating stock such as rods, tubes and the like while the stock is severed by a rotating cutting wheel, and to methods for cutting the stock.

Modern industry uses large quantities of stock materials like tubes, pipes, rods and related items which are normally manufactured in standard lengths so that the user must cut or sever them into proper lengths to fit his requirements. The continuing necessity for making such cuts renders it advantageous for the user to make the cuts as quickly and as cleanly as possible to reduce manufacturing and labor costs involved in performing the actual cutting and in cleaning the cut surfaces.

Use of high-speed cut-off wheels or blades constructed of Carborundum and similar materials to cut hard steel products has grown over the years and similar use of the more conventional toothed-blades on softer materials has also risen. There are many cutting machines using rotating cutting blades and they are limited for the most part, as to the size of stock which they can cut, to the radial length of cutting blade left exposed beyond the arbor and reinforcing rings mounted on either side of the blade. The cut is effected by contacting the stock on one side and advancing the blade generally diametrically through the stock, the last bit of material cut being the outside wall opposite the point of initial blade contact. For example, in one commercial device of this type a cutting blade of 12" diameter is specified to cut a tube of 2½" diameter or rod of 1½" diameter. Since cutting blades can be relatively expensive, the cost of keeping blades of a size enabling cutting of stock of any diameter represents an appreciable investment.

It is a primary object of this invention to provide a working support for elongated stock such as rods, tubes and the like which rotates the stock as the cut is being made so that the cut is made completely around the outer circumference of the material as the cutting blade progresses inwardly toward the center.

It is another object of this invention to provide a supporting apparatus for elongated stock such as rods, tubes and the like in which gauging structure is provided on the work support to provide ready measurement of the stock for cutting it into predetermined lengths and to act as a stop preventing axial movement of the stock.

It is another object of this invention to provide an improved work support in which the effective capacity of standard cutting machines using rotating blades can be increased, to provide a cleaner cut and to eliminate harmful burning resulting from friction with the rotating blade.

Another object of this invention is to provide an improved process for cutting stock having generally circular cross-sectional shape which reduces burning and enables quicker severing of the stock.

Other objects and advantages of this invention will be apparent from the following description, the accompanying drawings and the appended claims.

In the drawings—

Fig. 3 is a top plane view of the supporting apparatus showing the relationship of the driving roller with respect to the tube;

Fig. 4 is a schematic view showing the manner in which the present invention effects cutting of the tube; and Fig. 5 is a schematic view showing the manner in which the round bar stock is cut according to the present invention.

Figure 1:
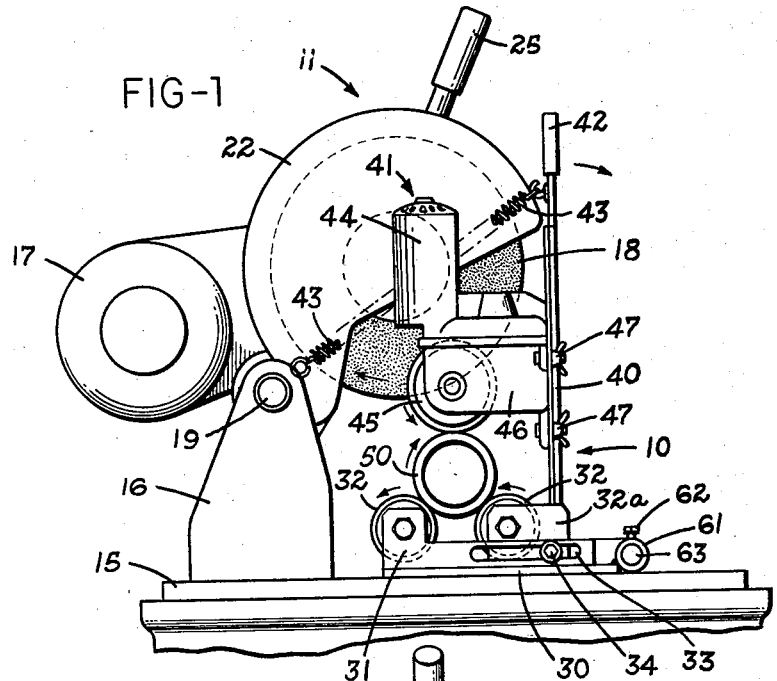
Fig. 1 is a side elevation of a cutting machine showing the stock supporting apparatus of the present invention mounted thereon.
Figure 2:
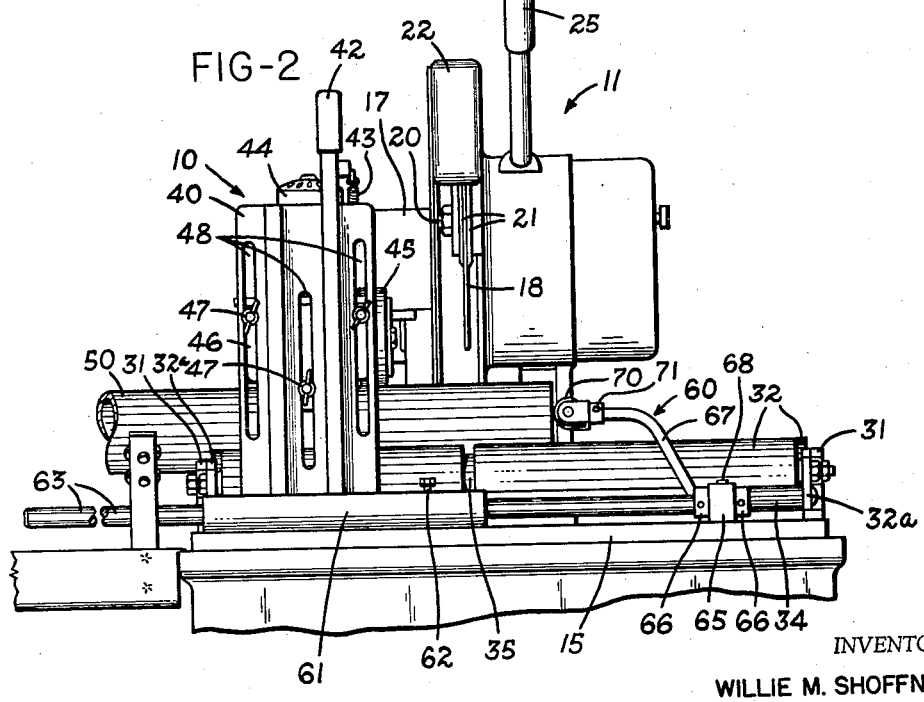
Fig. 2 is a front elevation of the apparatus showing a tube in position on the supporting apparatus for cutting by the cutting machine.

Referring to Figs. 1 and 2, the stock supporting apparatus 10 of the present invention is shown applied to a typical cutting machine 11 which utilizes a high speed abrasive cutting blade to effect severing of the various stock materials. The cutting apparatus 11 comprises a work table 15 having vertically extending arms adjacent the back side thereof rotatably supporting the motor 17 and cutting blade 18 for pivotal movement about axis 19. The cutting blade is mounted on a suitable arbor or shaft 20 and clamped between reinforcing rings 21 which are mounted on either side thereof, and protected by an external housing 22. The motor 17 is connected to the shaft 20 and the cutting blade can be pivoted into working position by grasping handle 25 and pulling it downwardly toward work table 15 while pivoting the motor upwardly about axis 19.

A piece of stock material such as a rod, tube, pipe, etc. rigidly clamped in position to extend across the plane of the cutting blade 18, would be cut by the blade entering the stock on one side thereof and advancing generally diametrically therethrough, the last part of stock material cut being the outside wall opposite the point of initial entry. In the case of tubular material, particularly, this cutting procedure has several disadvantages such as throwing incandescent metal particles into the interior of the tube and building up an agglomerated mass of effectively sintered material which hardens on the inner surface of the opposite wall. In the case of the relatively brittle abrading blades this can often result in breakage or at least enough deflection of the blade to result in an irregular and improper cut. Another disadvantage is the formation of heat due to the quantity of metal material being cut throughout about the last ⅓ of the diameter of the stock and due somewhat to friction of the side surfaces of the blade with the surfaces of the pipe abutting these side surfaces. The presence of excessive heat can seriously discolor the material and can in some instances, for example stainless steel, impair the corrosion resistant properties normally desired from that material.

The apparatus of the present invention, which overcomes these difficulties, comprises a flat generally rectangular base member 30 having a vertically extending wall 31 welded or otherwise secured on each end thereof for mounting a pair of spaced apart elongated rollers 32. One of the rollers, the rearmost, is mounted between a pair of vertical ears integral with wall 31 while the other roller is mounted between slidable plate 32a for adjustment toward and away from the rearmost roller by means of slot 33 and adjusting bolt 34, the bolt 34 extending across the entire width of the apparatus 10. As seen most clearly in Fig. 3 each of the rolls extends substantially across the entire width of work table 15 and contains a circumferential groove 35 in approximately the center thereof located beneath blade 18 to insure that the blade will not accidentally score the rolls, even though the blade will normally not come close to either of the rolls during cutting operation. The rollers 32 are freely rotatable and extend at substantially right angles to the plane of blade 18 to hold the stock in position for cutting when blade 18 is moved radially inwardly toward the center thereof.

The adjusting bolt 34, which extends the entire width of apparatus 10, has a vertically extending mounting bracket 40 mounted thereon adjacent the feed side, i.e. the left side as viewed in Fig. 3, of the apparatus for supporting stock driving means 41. Bracket 40 includes a handle 42 extending upwardly therefrom and a spring 43 is connected to the handle and to arm 16 to bias the driving means 41 toward operating position.

The stock driving means 41 includes a motor 44 which drives the friction roll 45 through a suitable gear box 46, the gear box being mounted for vertical adjustment on mounting bracket 40 by means of wing nuts 47 which fit onto suitable studs protruding from gear box 46 through the slots 48 in the mounting bracket. Referring to Fig. 3 it will be seen that the friction roller 45 contacts the surface of the stock, here shown as a tube 50, on the outer wall generally opposite the rollers 32 so that the biasing force exerted by spring 43 (Fig. 1) can act through handle 42 and driving means 41 to urge the drive roller against tube 50 holding it in proper operating position for cutting. Thus, there is relative rotational movement between supporting rollers 32 and the stock at all times. To release the tube 50 from position it is necessary only for the operator to pull the handle 42 toward him and pivot mounting bracket 40 about bolt 34 to raise the drive roller from the tube.

The drive wheel 45 is canted slightly with respect to tube 50 so that its axis 55 is slightly angularly disposed with respect to the axis 56 of tube 50 producing a longitudinal force component in the tube, as well as the rotational force, urging the tube toward the right side of the apparatus as viewed in Fig. 3.

Since it is often desired to cut relatively short lengths from stock material of standard lengths, the apparatus 10 includes gauging apparatus 60 having a circular mounting tube 61 which is attached to base 30 and carries a lock bolt 62 for rigidly positioning gauge bar 63 in adjusted position. The gauge bar 63 extends through the elongated opening in mounting tube 61 so that when bolt 62 is tightened neither rotational nor longitudinal adjustment of bar 63 can be effected. On the outer or right hand end of bar 63 a small block 65 is mounted between a pair of collars 66 and has an arm 67 attached to it at a spaced distance from bar 63 for pivotal movement into the path of the stock. Set screws 68 extend into block 65 for contact with both bar 63 and arm 67 so that either or both of these members can be pivoted with respect to the plug. An anti-friction roller 70 is attached to arm 67 for contact with the end of tube 50 to reduced friction between the tube and the gauging apparatus during the period of time that the tube is rotating and to act as a stop preventing the tube from moving axially as a result of the longitudinal force resulting from the angular displacement of roll 45. The roller 70 can be turned on arm 67 by adjustment of set screw 71 if desired. Thus to adjust for different lengths of stock material the operator need only loosen bolt 62 and axially adjust rod 63. Adjustment of the roller 70 can be effected by suitably adjusting the arm 67, the block 65 or the bar 63.

To operate the supporting apparatus, adjustment is first made in the gauging apparatus 60 so that roller 70 is spaced from the blade a distance equal to the length of stock required. The drive roller 45 is pivoted upwardly to allow the tube 50, or other piece of stock, to be slid into proper operating position and the drive roll 45 is then placed in contact with the outer surface of the tube 50. The spring 43 is under tension to cause the drive roll 45 to be in driving contact with the tube 50 and is operable to rotate the tube 50 in a direction which causes the surface movement to be against the rotation of the blade 18. The supporting rollers 32 will then be rotated by tube 50 in the opposite direction from its direction of rotation and the longitudinal component of force resulting from the angular mounting of roll 45 with respect to work piece 50 will keep it in contact against gauge roller 70. The handle 25 may then be grasped and the cutting blade 18 brought into contact with the outer surface of tube 50 so that an initial cut will commence. With the application of steady pressure to the cutting blade, referring to Fig. 4, the blade will form a cut 75 extending completely around the outer circumference of the pipe before further radial movement of the blade 18 inwardly toward the center of the pipe will occur. As maintained pressure is applied urging the cutting blade inwardly toward the center of the tube, other layers of material will be removed from the tube and the inner wall of the tube will be the last portion to be cut. It is apparent from this description that the effective radial cutting length of the blade 18 need only be slightly greater than the wall thickness of the tube to effect complete severance thereof, rather than in excess of the total diameter of the tube as is the case with existing apparatus.

Fig. 5 shows a blade 18 as cutting a piece of solid stock 76. The cutting progression is the same as that outlined in connection with tube 50 with the exception that the effective radial cutting length of the blade 18 must approximate the radius R, this quantity still being less than that ordinarily necessary with existing apparatus.

Thus, the present invention provides for a quicker, cleaner and more accurate cut as well as achieving longer active blade life by requiring less effective radial cutting length on the blade. The blade can be used a longer time because wear will not reduce it below the required size as quickly as on apparatus using conventional supporting apparatus and feeding methods.

While the process herein described, and the form of apparatus for carrying this process into effect, constitute preferred embodiments of the invention, it is to be understood that the invention is not limited to this precise process and form of apparatus, and that changes may be made in either without departing from the scope of the invention which is defined in the appended claims.

What is claimed is:

1. Apparatus for supporting elongated stock such as rods, tubes and the like in position for cutting by a machine having a rotating blade movable into operative engagement with said stock, comprising a stock support including roller means for holding said stock in position for cutting by said rotating blade while said blade is moved inwardly toward the center of said stock, adjustable gauging means mounted on said stock support for measuring predetermined lengths thereof, a roller mounted on said gauging means for contact with one end of said stock to reduce the friction between said stock and said gauging means, driving means including a motor mounted on said support, and a frictional drive roller mounted on said driving means with its axis slightly angularly disposed with respect to the axis of said stock in the direction to urge said stock against said roller on said gauging means while rotating said stock on said roller means to provide for severing of said stock with a cut extending completely around the outer circumference thereof.

2. Apparatus for supporting elongated stock such as rods, tubes and the like in position for cutting by a rotating blade movable bodily into operative engagement with said stock, comprising a stock support including roller means for holding said stock in position for cutting by said rotating blade while said blade is moved inwardly toward the center of said stock, a gauging rod mounted on said stock support for longitudinal adjustment to measure the length of said stock material to be cut, an arm mounted on said gauging rod for pivotal movement into the path of said stock, a roller mounted on the end of said arm for contact with one end of said stock to position said stock for cutting predetermined lengths thereof, driving means including a motor mounted on said support, and a frictional drive roller mounted on said driving means with its axis slightly angularly disposed with respect to the axis of said stock in the direction to urge said stock against said roller on said gauging rod while rotating said stock on said roller means to provide for severing of said stock with a cut extending completely around the outer circumference thereof.

3. Apparatus for supporting elongated stock such as rods, tubes and the like in position for cutting by a machine having a rotating blade movable into operative engagement with said stock, comprising a stock support including roller means for holding said stock in position for cutting by said rotating blade while said blade is moved inwardly toward the center of said stock, gauging means mounted on said stock support for measuring predetermined lengths thereof, a roller mounted on said gauging means for contact with one end of said stock to reduce the friction between said stock and said gauging means, stock rotating means including a drive roller engageable with said stock to cause stock rotation on said roller means to provide for severing of said stock with a cut extending completely around the outer circumference thereof, and means cooperating with said stock rotating means to bias said stock into engagement with said roller on said gauging means.

References Cited in the file of this patent

UNITED STATES PATENTS

| | | |
|---|---|---|
| 1,415,416 | Tilling et al. | May 9, 1922 |
| 1,452,508 | Hervig | Apr. 24, 1923 |
| 1,611,418 | Clipsham | Dec. 21, 1926 |
| 1,885,188 | Deutsch | Nov. 1, 1932 |
| 2,206,842 | Indge | July 2, 1940 |
| 2,353,590 | Schutz | July 11, 1944 |
| 2,435,156 | Pealer | Jan. 27, 1948 |
| 2,741,074 | Copczynski | Apr. 10, 1956 |